United States Patent [19]

Robinson et al.

[11] Patent Number: 5,185,395
[45] Date of Patent: Feb. 9, 1993

[54] AMPS COPOLYMER EMULSIONS WITH IMPROVED STABILITY

[75] Inventors: Peter M. Robinson, High Point, N.C.; Nguyen Van-Det, Midland, Ga.

[73] Assignee: Exxon Chemical Patents Inc., Linden, N.J.

[21] Appl. No.: 675,787

[22] Filed: Mar. 27, 1991

[51] Int. Cl.$^5$ ............................................. C08J 3/02
[52] U.S. Cl. ..................................... 524/457; 524/505
[58] Field of Search ................................ 524/457, 505

[56] References Cited

U.S. PATENT DOCUMENTS 4,203,877  5/1980  Baker ..................................... 524/500
4,918,123  4/1990  Yang et al. ........................... 524/457 X

FOREIGN PATENT DOCUMENTS 2706308  9/1977  Netherlands ......................... 524/457

Primary Examiner—Joseph L. Schofer
Assistant Examiner—J. M. Reddick

[57] ABSTRACT

Copolymer water-in-oil emulsions of 2-acrylamido-2-methylpropane sulphonic acid (AMPS) monomer and an anionic comonomer such as methacrylic acid are prepared with substantially less coagulum formation by means of a specific dual surfactant system. The resultant emulsions have enhanced long-term storage stability.

18 Claims, No Drawings

AMPS COPOLYMER EMULSIONS WITH IMPROVED STABILITY

BACKGROUND OF THE INVENTION

1. Field of the Invention

This invention relates generally to an improved surfactant system to prepare water-in-oil emulsion copolymers of 2-acrylamido-2-methylpropane sulphonic acid (AMPS) and an anionic comonomer. More particularly, the present invention utilizes a dual emulsion polymerization stabilizer mixture of sorbitan monooleate and a linear ABA block copolymer of polyesterpolyethylene oxide-polyester to produce the emulsion copolymers.

2. Description of the Prior Art

The preparation of water-in-oil emulsion polymers and copolymers is well known in the art and generally entails dissolving the monomer(s) in an aqueous phase, homogenizing the aqueous phase with an oil phase containing one or more emulsion polymerization stabilizers, and polymerizing the monomer(s). It was discovered that when attempting to produce copolymers of AMPS and anionic comonomers neither a conventional sorbitan monooleate polymerization stabilizer nor a conventional linear ABA block copolymer as disclosed in U.S. Pat. No. 4,203,877 alone were adequate to obtain a smooth polymerization profile, little or no coagulum formation during the polymerization, and a product having good long term storage stability.

Accordingly, it is an object of the present invention to produce a copolymer emulsion of AMPS and an anionic comonomer in which the polymerization profile is smooth, less than about 1% coagulum is formed during the polymerization, and the final emulsion product remains stable and ungelled after at least two months storage.

DESCRIPTION OF THE INVENTION

In accordance with the present invention, there is provided an improved process of preparing water-in-oil emulsion copolymers of AMPS and an anionic comonomer which comprises (i) preparing an aqueous solution of the AMPS and anionic comonomers, (ii) emulsifying the aqueous solution in a sufficient quantity of a hydrocarbon oil which contains a mixture of sorbitan monooleate and a linear ABA block copolymer of the type polyester-polyethylene oxide-polyester, and (iii) copolymerizing the AMPS and the anionic comonomer to form the water-in-oil emulsion copolymer. The copolymer emulsions so produced exhibit increased long term storage stability.

The copolymers of the present invention are comprised of about 10 to 30 weight % 2-acrylamido-2-methylpropane sulphonic acid (AMPS) monomer and about 90 to 70 weight % of an anionic comonomer. Examples of suitable anionic comonomers include acrylic acid, methacrylic acid, itaconic acid, maleic acid, fumaric acid, and betacarboxyethyl acrylate, a dimer of acrylic acid, and their salts. Preferably, the copolymers contain about 15 to 25 weight % AMPS and about 75 to 85 weight % of the anionic comonomer which is acrylic acid, methacrylic acid, or their salts. Most preferably, the anionic comonomer is methacrylic acid.

In addition to the AMPS and anionic comonomer, the copolymers may also contain minor amounts of additional monomers. Examples of such additional monomers include: nonionic monomers such as acrylamide, methacrylamide, N-methylacrylamide, N-methylmethacrylamide, diacetone acrylamide, and the like; cationic monomers such as the methosulfate or methylchloride quaternaries of such as dimethylaminoethyl acrylate, dimethylaminoethyl methacrylate, diethylaminoethyl acrylate, and diethylaminoethyl methacrylate, as well as 3-methylacrylamido)propyltrimethylammonium chloride, diallyldimethylammonium chloride, 1-trimethylammonium-2-hydroxypropyl methacrylate methosulfate, and the like; vinyl acetate, methyl acrylate, ethyl acrylate, propyl acrylate, methyl methacrylate, ethyl methacrylate, hydroxyethyl acrylate, hydroxyethyl methacrylate, styrene, acrylonitrile, dimethylaminopropylmethacrylamide, isopropylaminopropyl methacrylamide, methacrylamidopropylhydroxyethyldimethylammonium acetate, vinyl methyl ether, vinyl ethyl ether, vinyl pyridine, vinyl pyrrolidone, vinyl imidazole, and the like.

The emulsion polymerization stabilizer system which is used to produce the copolymer emulsions is a combination of sorbitan monooleate and a linear ABA block copolymer of polyester-polyalkylene oxide-polyester. The stabilizer system is used in a total amount as low as possible and generally less than about 5 weight % of the total emulsion. Preferably, the amount is not greater than about 3%. The sorbitan monooleate will generally represent about 25 to 65% of the combination, preferably about 30 to 60%, with the ABA block copolymer the remainder.

Suitable ABA block copolymers are disclosed in U.S. Pat. No. 4,203,877, the disclosure of which is incorporated herein by reference. Preferably, the ABA block copolymer is prepared by reacting condensed 12-hydroxystearic acid with an alkylene oxide. Most preferably, the ABA block copolymer is prepared by the reaction of condensed 12-hydroxystearic acid and ethylene oxide and contains about 20 to 40 weight % ethylene oxide. Such a most preferable copolymer is available as Rapisol ® B-246 from Imperial Chemical Industries Limited.

Although the present invention has been found to be independent of the particular emulsion polymerization method employed provided that the specified emulsion polymerization stabilizer system is used, certain preferences are delineated in the general description of the emulsion preparation which follows in which all percents are by weight unless otherwise specified.

A preliminary emulsion is made by homogenizing oil and aqueous phases. The oil phase of the emulsion, which generally comprises from about 5 to 35% of the total emulsion, is comprised of one or more inert hydrophobic liquids. Preferably, the oil phase comprises about 15 to 30% of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, napthas, chlorinated hydrocarbons, such as perchloroethylene, and the like. The oil phase also contains the emulsion polymerization stabilizer system of this invention.

The aqueous phase generally comprises about 95 to 65%, preferably about 85 to 70%, of the emulsion. In addition to water, it contains the monomers being polymerized. Generally the water will be present in an amount of less than about 45%, preferably about 20 to about 40%, and most preferably about 25 to about 35%, of the total emulsion. It will usually contain the conventional chain transfer agents, initiators and sequestrants, all in conventional amounts. Alternatively, they may be added to the system after the preliminary emulsion has been prepared. The initiator may also be added continuously during the polymerization to better control the rate of polymerization, depending upon the particular monomers used and their reactivities. All of these variations are well known in the art.

Any conventional chain transfer agent, such as propylene glycol, isopropanol, 2-mercaptoethanol, sodium hypophosphite, dodecyl mercaptan, or thioglycolic acid, may be employed. The chain transfer agent is generally present in an amount of about 0.1 to 10 percent by weight of the total emulsion, though more may be used if desired for a particular product.

The initiator may be any free radical producing material well known in the art. The preferred free radical producers are the redox-type and the azo-type polymerization initiators. They may be used either individually or more preferably in combination to promote a smoother conversion profile, generating linear high molecular weight polymers in high yields. Generally the initiator is in an amount of about 0.0005 to 0.5% by weight of the total emulsion. Radiation may also be used to initiate the reaction.

Any conventional sequestrant may also be present in the aqueous phase. Examples include such as ethylenediaminetetraacetic acid or pentasodium diethylenetriamine pentaacetate. The sequestrant is generally present in an amount of about 0.01 to 2% of the total emulsion, though more may be utilized.

The polymerization is then initiated and continues until the desired high molecular weight polymer is produced. The polymerization is generally operated at a temperature of about $-20°$ to $200°$ C., preferably at about $0°$ to $100°$ C., and most preferably at about $35°$ to $75°$ C. Preferably, the polymerization is run at a pH of about 2 to 12 and a suitable amount of base or acid is added to the preliminary emulsion to achieve the desired pH. The polymerization is usually completed in about an hour or two to several days, depending upon the monomers employed and other reaction variables. It is generally performed at atmospheric pressure, but higher pressures are advantageously used when volatile ingredients are involved.

Following completion of the polymerization, the pH of the emulsion may be adjusted as desired, generally to about 5 to 12. A breaker surfactant is generally added to yield a self-inverting final product. Any suitable breaker surfactant may be employed, routine experimentation being the best means to determine which breaker surfactant will perform optimally for each emulsion system. Typical breaker surfactants include those having relatively high HLB numbers such as ethoxylated octyl and nonyl phenols, ethoxylated nonyl phenol formaldehyde resin, polyethylene oxide esters of fatty acids, dioctyl esters of sodium sulfosuccinate and others disclosed in U.S. Pat. No. 3,624,019, the disclosure of which is incorporated herein by reference. Typically, the breaker surfactant is used in an amount equal to about 0.5 to 5% by weight, preferably below about 3%, and most preferably below about 2.5%, based on the weight of the total emulsion.

The copolymer emulsions of the present invention are particularly useful as components of drilling muds for the recovery of oil.

The following examples are illustrative of the present invention, but are not in any way a limitation thereof. All percents and parts are by weight unless otherwise specified.

Comparative Example A

A water phase containing 4.683 parts 2-acrylamido-2-methylpropane sulphonic acid, 19.706 parts methacrylic acid, 0.2 parts pentasodium diethylenetriamine pentaacetate, 0.224 parts of 5% potassium bromate solution, 0.6 parts sodium hypophosphite, 0.4 parts isopropanol, 30 parts of 30% potassium, ammonium hydroxide solution, and 10.807 parts water is homogenized in a high efficiency homogenizer with an oil phase containing 25 parts oil, 1.75 parts Rapisol® B-246, 0.08 parts 2,2'-azobis(isobutyronitrile) in xylene. The resultant emulsion system is transferred to a suitable reaction vessel with stirring and is sparged with nitrogen. 0.3 parts of a 30% sodium metabisulfite solution is added to commence polymerization and then 2.0 parts of a 1% sodium metabisulfite solution is added continuously during the polymerization. The temperature of the emulsion increases to about 50°–70° C. External heating is provided to maintain this temperature and agitation is maintained for 4–10 hours. The polymerization is completed at the end of that time.

The polymerization profile is erratic, i.e. it is difficult to control the conversion rate profile of the polymerization, the reaction viscosity is not stable (constant). The polymerization generates an emulsion product containing a substantial amount of gels and more than 20% water-insoluble coagulum.

To produce a self-inverting emulsion product to evaluate the storage stability of the product, 4.5 parts of a breaker system composed of a 3.5:1 blend of the reaction product of nonylphenol with 6 moles of ethylene oxide and the reaction product of dinonylphenol with 10 moles of ethylene oxide is added. The product is difficult to invert into water for application use.

The product is substantially completely gelled, and thus unusable, within 5 days.

Comparative Example B

The procedure of Comparative Example A is repeated except that the 1.75 parts Rapisol® B-246 is replaced with 2.5 parts of sorbitan monoleate.

The polymerization profile is again erratic generating an emulsion product containing a substantial amount of gels and more than 20% water-insoluble coagulum. The emulsion gelled at the end of the polymerization.

Comparative Example C

The procedure of Comparative Example A is repeated except that the 1.75 parts Rapisol® B-246 is replaced with 12.5 parts of hydrogenated ricinoleic acid triglyceride which has been ethoxylated with five moles of ethylene oxide and 5 parts of sorbitan monooleate.

The polymerization profile is again erratic. The emulsion gelled at the end of polymerization.

EXAMPLE I

The procedure of Comparative Example A is repeated except that the amount of the Rapisol® B-246 is reduced to 0.75 parts and 0.75 parts of sorbitan monoleate is added therewith.

The polymerization profile is smooth, i.e. the reaction conversion rate of the polymerization is easy to control, and the emulsion viscosity is stable during the polymerization. The resulting emulsion product containing 22% active polymer solids and less than 0.1% water-insoluble coagulum.

After addition of the breaker system, the product is completely ungelled after more than 3 months storage at room temperature.

EXAMPLE II

The procedure of Example I is repeated except that the emulsion polymerization stabilizer system contains 1.25 parts Rapisol® B-246 and 0.75 parts of sorbitan monoleate.

The polymerization profile is again smooth and again less than 0.1% coagulum is formed.

After addition of the breaker system, the product is completely ungelled after more than 3 months storage at room temperature.

EXAMPLE III

The three procedures of Comparative Examples A and B and Example I are repeated except that the methacrylic acid is replaced by an equivalent weight of acrylic acid.

The polymerizations which utilize either the sorbitan monooleate or the ABA block copolymer alone are, as in Comparative Examples A and B above, erratic and generate more than about 20 % coagulum. However, when the combination of emulsion polymerization stabilizers is used, as in Example I, a smooth polymerization profile occurs and less than 0.5 % coagulum is produced.

What is claimed is:

1. In a method of preparing a water-in-oil emulsion which contains a copolymer of (a) about 10 to 30 weight % 2-acrylamido-2-methylpropane sulphonic acid monomer and (b) about 90 to 70 weight % of an anionic comonomer, which comprises the steps of (i) preparing an aqueous solution of the monomers, (ii) emulsifying the aqueous solution in a sufficient quantity of a hydrocarbon oil which contains an emulsion polymerization stabilizer to form a water-in-oil emulsion, and (iii) polymerizing the monomers, the improvement comprising using as the emulsion polymerization stabilizer a mixture in a total amount of about 1 to 3 weight %, based on the weight of the total emulsion, which mixture contains about 25 to 65 weight % sorbitan monooleate and about 75 to 35 weight % of a linear ABA block copolymer of polyester-polyethylene oxidepolyester which is prepared by the reaction of condensed 12-hydroxystearic acid with an alkylene oxide.

2. The method of claim 1, wherein the anionic monomer is selected from the group consisting of acrylic acid, methacrylic acid, itaconic acid, maleic acid, fumaric acid, and β-carboxyethyl acrylate, and their salts.

3. The method of claim 1, wherein the alkylene oxide is ethylene oxide and the linear ABA block copolymer contains about 20 to 40 weight % ethylene oxide.

4. The method of claim 1, wherein the copolymer is composed of about 15 to 25 weight % 2-acrylamido-2-methylpropane sulphonic acid and (b) about 85 to 75 weight % methacrylic acid.

5. The method of claim 1, wherein the emulsion polymerization stabilizer mixture contains about 30 to 60 weight % sorbitan monooleate.

6. The method of claim 1, wherein the emulsion further contains both a redox initiator and an azo initiator.

7. The method of claim 5, wherein the azo initiator is 2,2'-azobis(isobutyronitrile).

8. The method of claim 1, wherein the anionic comonomer is acrylic acid.

9. The method of claim 1, wherein the anionic comonomer is methacrylic acid.

10. In a water-in-oil emulsion suitable for preparing an emulsion copolymer composed of (a) about 10 to 30 weight % 2-acrylamido-2-methylpropane sulphonic acid monomer and (b) about 90 to 70 weight % of an anionic comonomer, which comprises an aqueous solution of the monomers, a hydrocarbon oil which contains an emulsion polymerization stabilizer, the improvement which comprises the emulsion polymerization stabilizer being a mixture in a total amount of about 1 to 3 weight %, based on the weight of the total emulsion, of about 25 to 65 weight % sorbitan monooleate and about 75 to 35 weight % of a linear ABA block copolymer of polyester-polyethylene oxide-polyester which is prepared by the reaction of condensed 12-hydroxystearic acid with an alkylene oxide.

11. The emulsion of claim 10, wherein the anionic monomer is selected from the group consisting of acrylic acid, methacrylic acid, itaconic acid, maleic acid, fumaric acid, β-carboxyethyl acrylate, and their salts.

12. The emulsion of claim 10, wherein the alkylene oxide is ethylene oxide and the linear ABA block copolymer contains about 20 to 40 weight % ethylene oxide.

13. The emulsion of claim 10, wherein the copolymer is composed of about 15 to 25 weight % 2-acrylamido-2-methylpropane sulphonic acid and (b) about 85 to 75 weight % methacrylic acid.

14. The emulsion of claim 10, wherein the emulsion polymerization stabilizer mixture contains about 30 to 60 weight sorbitan monooleate.

15. The emulsion of claim 10, further containing both a redox initiator and an azo initiator.

16. The emulsion of claim 15, wherein the azo initiator is 2,2'-azobis(isobutyronitrile).

17. The emulsion of claim 10, wherein the anionic comonomer is acrylic acid.

18. The emulsion of claim 10, wherein the anionic comonomer is methacrylic acid.

* * * * *